US012325591B2

(12) United States Patent
Shimamura

(10) Patent No.: US 12,325,591 B2
(45) Date of Patent: Jun. 10, 2025

(54) ARTICLE TRANSPORT FACILITY

(71) Applicant: Daifuku Co., Ltd., Osaka (JP)

(72) Inventor: Junichi Shimamura, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 853 days.

(21) Appl. No.: 17/513,135

(22) Filed: Oct. 28, 2021

(65) Prior Publication Data

US 2022/0135328 A1 May 5, 2022

(30) Foreign Application Priority Data

Nov. 4, 2020 (JP) ................................ 2020-184557

(51) Int. Cl.
*B65G 1/137* (2006.01)
*B65G 1/04* (2006.01)

(52) U.S. Cl.
CPC ......... *B65G 1/1371* (2013.01); *B65G 1/0421* (2013.01); *B65G 1/1373* (2013.01)

(58) Field of Classification Search
CPC ...... B65G 1/1371; B65G 1/0421; B65G 1/04; B65G 1/1373
See application file for complete search history.

(56) References Cited

U.S. PATENT DOCUMENTS

| 7,686,559 | B2 | 3/2010 | Tsujimoto et al. | |
| 2006/0098843 | A1* | 5/2006 | Chew | B61L 23/041 |
| | | | | 382/104 |
| 2006/0276930 | A1* | 12/2006 | Tsujimoto | B65G 1/0492 |
| | | | | 700/214 |

FOREIGN PATENT DOCUMENTS

| DK | 2332859 | T3 | * | 3/2016 | ............... B65G 1/04 |
| JP | 1159819 | A | | 3/1999 | |
| JP | 2004277167 | A | * | 10/2004 | |
| JP | 2006335484 | A | | 12/2006 | |
| JP | 4273423 | B2 | | 3/2009 | |
| JP | 2015009953 | A | | 1/2015 | |
| JP | 2019175163 | A | * | 10/2019 | ........... B64C 39/024 |

OTHER PUBLICATIONS

JP 2004277167, "Back up Method of Plurality of Stacker Cranes Operated in Automatic Warehouse", Yamamoto Hiroyuki (Year: 2003).*
JP 2019175163, "Accommodation Facilities Management Device", Tateiwa Masayuki (Year: 2018).*

* cited by examiner

*Primary Examiner* — Ernesto A Suarez
*Assistant Examiner* — Laurence R Brothers
(74) *Attorney, Agent, or Firm* — The Webb Law Firm

(57) ABSTRACT

A control device is capable of executing a first abnormality control, a retraction control, and a second abnormality control. The first abnormality control is a control in which a transferable range in which the normal unit is capable of transferring the article to and from the storage section without interfering with the abnormal unit is set to a partial range of the article storage rack, and the normal unit is operated using one or more of the storage sections included in the transferable range as the transfer target location. The second abnormality control is a state in which the abnormal unit is retracted to the retracted position, the transferable range is set to a range wider than the transferable range set in the first abnormality control, and the normal unit is operated using a plurality of the storage sections included in the transferable range as the transfer target location.

9 Claims, 10 Drawing Sheets

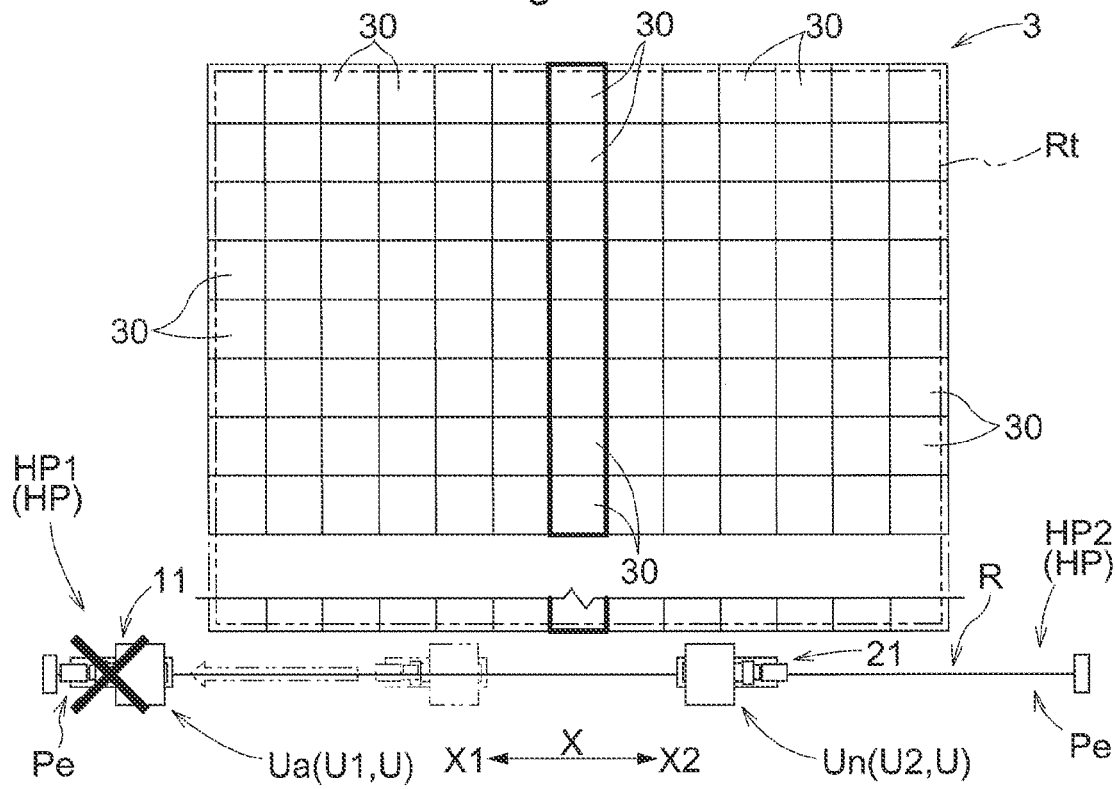
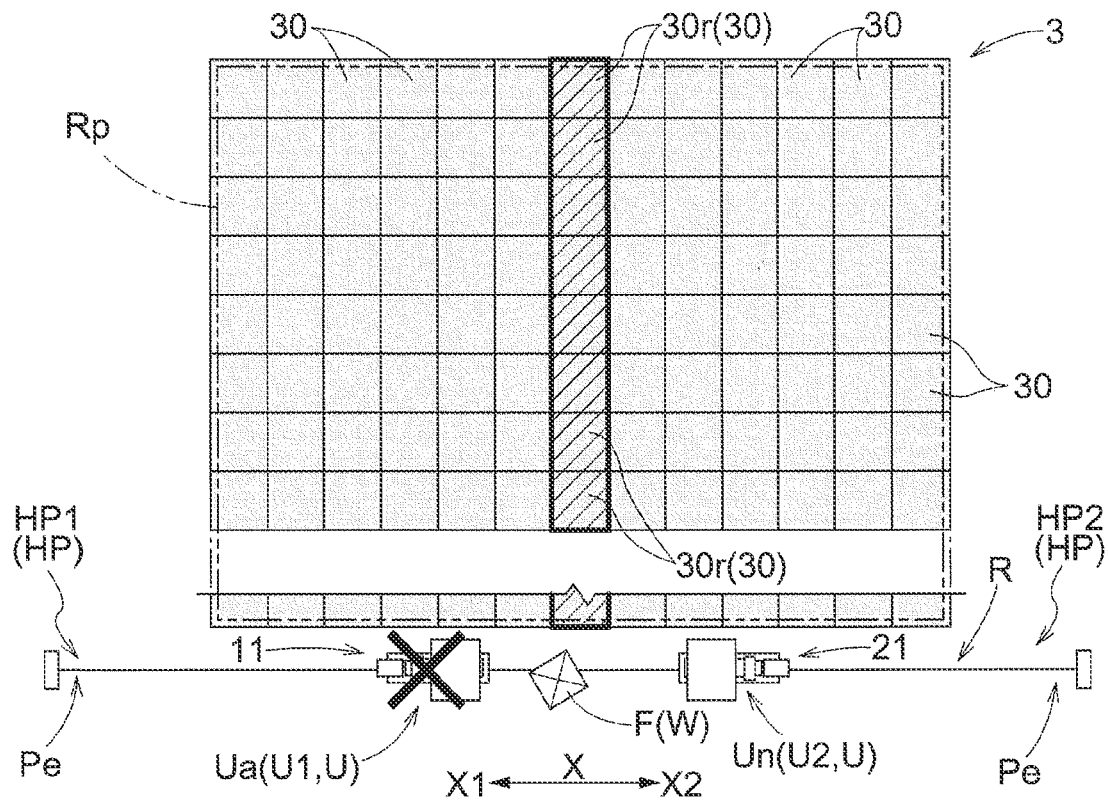

ARTICLE TRANSPORT FACILITY

CROSS-REFERENCE TO RELATED APPLICATIONS

This application claims priority to Japanese Patent Application No. 2020-184557 filed Nov. 4, 2020, the disclosure of which is hereby incorporated by reference in its entirety.

BACKGROUND OF THE INVENTION

1. Field of the Invention

The present invention relates to an article transport facility including an article storage rack including a plurality of storage sections that each store an article, an ended travel path that is set along a traveling direction extending along a front of the article storage rack, two transport units that each transport the article, and a control device that controls both of the transport units.

2. Description of the Related Art

An example of such an article transport facility is disclosed in Japanese Patent No. 4273423 (Patent Document 1). In the following, the reference numerals shown in parentheses in the description of the related art are those of Patent Document 1.

In the article transport facility disclosed in Patent Document 1, when an abnormality that makes it impossible to continue transport has occurred in one transport unit (4a) of two transport units (4a, 4b), the abnormal transport unit (4a) is pushed and retracted to a retracted position (T) by the normal transport unit (4b). However, during this retraction, the normal transport unit (4b) cannot perform a transport operation, and therefore the overall operating ratio of the facility is reduced.

SUMMARY OF THE INVENTION

In view of the above-described circumstances, it is desirable to realize an article transport facility that can reduce the reduction in the overall operating ratio of the facility even if an abnormality that makes it impossible to continue transport has occurred in one of two transport units.

An article transport facility according to the present disclosure is an article transport facility including: an article storage rack including a plurality of storage sections that each store an article;
  an ended travel path that is set along a traveling direction extending along a front of the article storage rack;
  two transport units that each transport the article; and
  a control device that controls both of the transport units, wherein each of the two transport units includes a travel portion that travels along the travel path, a holding portion that holds the article, and a transfer portion that transfers the article between the holding portion and a storage section among the plurality of storage sections that is set as a transfer target location,
  the two travel portions are configured to be unable to pass each other on the travel path, and,
  the transport unit that has stopped abnormally due to occurrence of an abnormality being denoted as an abnormal unit, and the transport unit that can be operated normally being denoted as a normal unit,
  the control device is capable of executing a normal operation control in which the two normal units are operated so as not to interfere with each other, and, when one of the two transport units is the abnormal unit, and the other is the normal unit, is capable of executing a first abnormality control, a retraction control, and a second abnormality control,
  the first abnormality control is a control in which a transferable range in which the normal unit is capable of transferring the article to and from the storage section without interfering with the abnormal unit is set to a partial range of the article storage rack, and the normal unit is operated using one or more of the storage sections included in the transferable range as the transfer target location,
  the retraction control is a control for moving the abnormal unit to a retracted position that is set in an end region of the travel path in the traveling direction, and
  the second abnormality control is a control in which, in a state in which the abnormal unit is retracted to the retracted position, the transferable range is set to a range wider than the transferable range set in the first abnormality control, and the normal unit is operated using a plurality of the storage sections included in the transferable range as the transfer target location.

With this configuration, the first abnormality control is executed by the control device when one of the two transport units has stopped abnormally due to occurrence of an abnormality. In the first abnormality control, the transferable range in which the normal unit that can be operated normally can transfer the article to and from the storage section without interfering with the abnormal unit that has stopped abnormally is set to a partial range of the article storage rack. Also, the normal unit is operated using one or more of the storage sections included within the transferable range as the transfer target locations. With such a configuration, it is possible to operate the normal unit in a limited manner within a range in which the normal unit can be operated, without waiting for the abnormal unit to be moved to the retracted position. Accordingly, it is possible to reduce the reduction in the overall operating ratio of the facility. After the retraction control has been executed, and the abnormal unit has been moved to the retracted position, the normal unit can be operated by executing the second abnormality control, using, as the transfer target locations, a plurality of the storage sections included in a range wider than the transferable range set in the first abnormality control. Accordingly, in this respect as well, it is possible to reduce the reduction in the overall operating ratio of the facility.

Further features and advantages of the technique according to the present disclosure will become apparent from the following description of illustrative and non-limiting embodiments with reference to the drawings.

BRIEF DESCRIPTION OF THE DRAWINGS

FIG. 7 is a control map used when executing a second abnormality control after executing a retraction control.

FIG. 8 is a control map used when a foreign object is present on a travel path.

DETAILED DESCRIPTION OF PREFERRED EMBODIMENTS

First Embodiment

In the following, an article transport facility according to a first embodiment will be described.

Mechanical Configuration of Article Transport Facility

Figure 1:
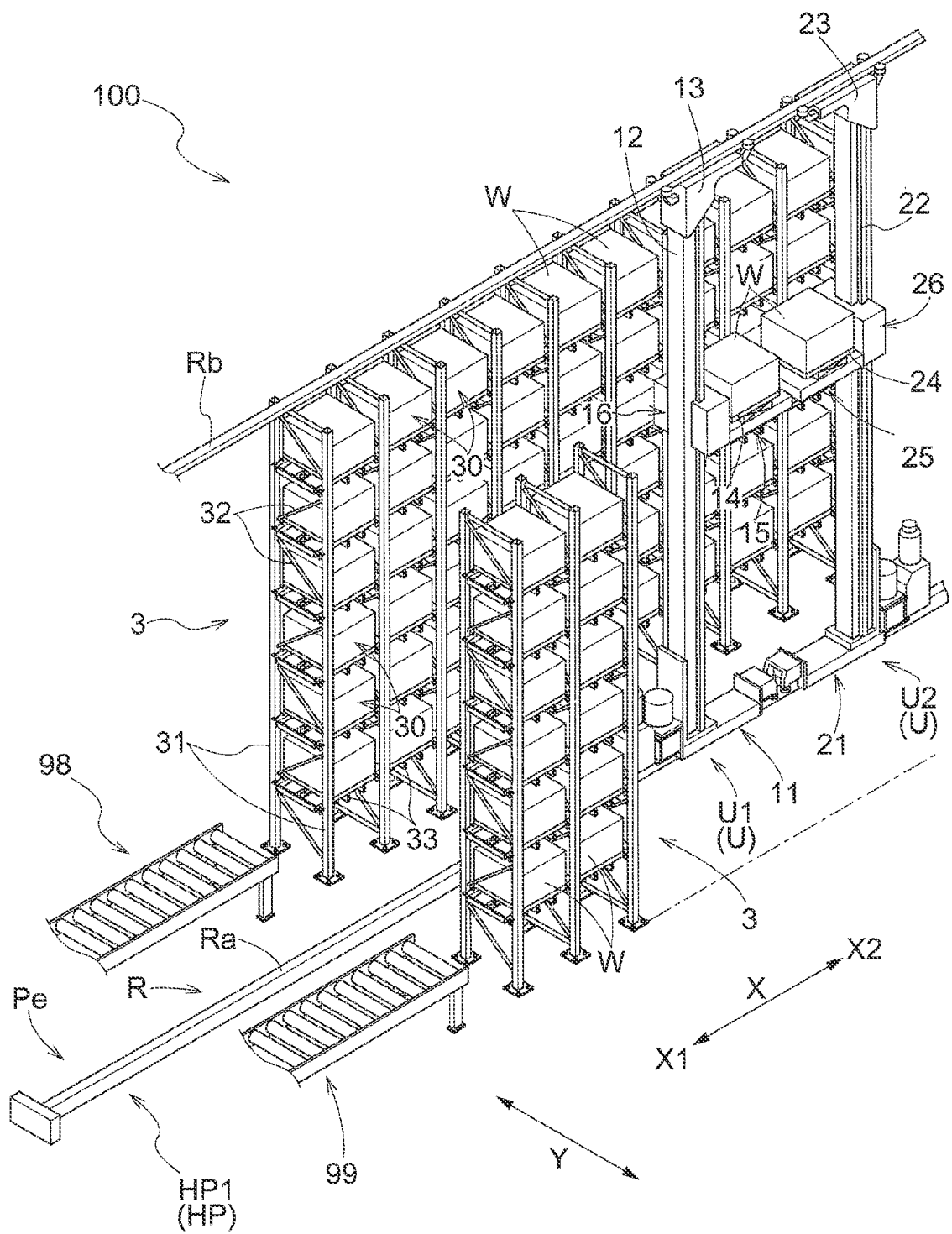
FIG. 1 is a perspective view of an article transport facility.
Figure 2:
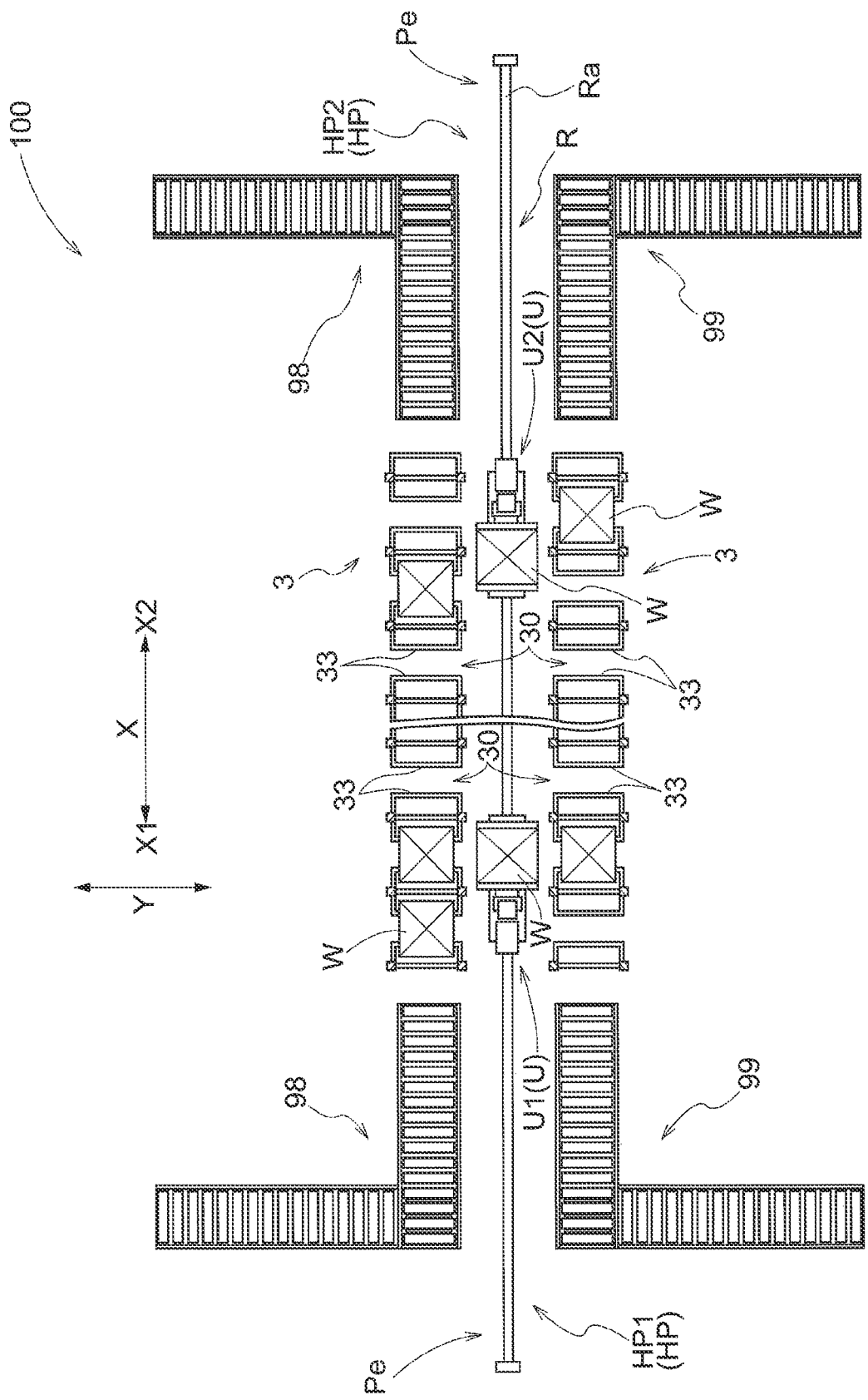
FIG. 2 is a plan view of the article transport facility.

A mechanical configuration of the article transport facility will be described. As shown in FIGS. 1 and 2, an article transport facility 100 includes article storage racks 3 each including a plurality of storage sections 30 that each store an article W, an ended travel path R that is set along a traveling direction X extending along a front of the article storage rack 3, and two transport units U that each transport the article W. The "front of the article storage rack 3" refers to a plane of the article storage rack 3 where portions corresponding to access ports thorough which the articles W are placed in and taken out are provided. More specifically, the above-described front is a virtual plane through which, when each transport unit U transfers an article W to a storage section 30 provided in the article storage rack 3, the article W to be transferred passes in an end region of the article storage rack 3. In the illustrated example, a pair of article storage racks 3 are provided opposite to each other with a travel path R interposed therebetween. Each of the two article storage racks 3 is disposed adjacent to the travel path R, with its front facing the travel path R.

In the following, a direction in which the article storage racks 3 and the travel path R are arranged is referred to as an "arrangement direction Y". The traveling direction X and the arrangement direction Y are orthogonal to each other in a plan view. One side in the traveling direction X is referred to as a "traveling direction-first side X1", and the other side in the traveling direction X is referred to as a "traveling direction-second side X2".

Each of the article storage racks 3 includes a plurality of struts 31 aligned at predetermined intervals in the traveling direction X and the arrangement direction Y, and disposed along the up-down direction at their respective positions, a plurality of coupling members 32 that couple the plurality of struts 31, and placement plates 33 each constituting a storage section 30 for storing the article W. The article W is stored in each storage section 30 while being placed on the placement plate 33. In the present embodiment, the plurality of storage sections 30 are disposed so as to be arranged in the traveling direction X and the up-down direction. The plurality of storage sections 30 are disposed in a grid so as to be arranged in the traveling direction X and the up-down direction, as viewed in the arrangement direction Y.

In the present embodiment, the article transport facility 100 includes a loading device 99 that loads articles W that are to be stored in the article storage rack 3, and an unloading device 98 that unloads articles W that are to be retrieved from the article storage racks 3. Each of the loading device 99 and the unloading device 98 is disposed outward of the article storage racks 3 in the traveling direction X, and is disposed adjacent to the travel path R in the arrangement direction Y. Each of the loading device 99 and the unloading device 98 is configured to be capable of handling over articles W with the transport units U located on the travel path R. An article W that is to be stored is loaded from the outside of the facility from the loading device 99, and transferred from the loading device 99 to each transport unit U. Then, the article W is transferred to the storage section 30 of the article storage rack 3 by the transport unit U. Conversely, an article W that is to be retrieved is taken out from the storage section 30 of the article storage rack 3 by the transport unit U. Then, the articles W are transferred from the transport units U to the unloading device 98, and unloaded by the unloading device 98. In the present example, the loading device 99 and the unloading device 98 are each formed by a conveyor.

Here, one of the two transport units U is denoted as a first transport unit U1, and the other is denoted as a second transport unit U2. The first transport unit U1 and the second transport unit U2 are disposed on the same travel path R. The first transport unit U1 is disposed on the traveling direction-first side X1 relative to the second transport unit U2. The second transport unit U2 is disposed on the traveling direction-second side X2 relative to the first transport unit U1. The structure of the first transport unit U1 and the structure of the second transport unit U2 are equivalent. Hereafter, when there is no need to distinguish between the first transport unit U1 and the second transport unit U2, the two transport units may be collectively referred to as a "transport unit U".

Figure 3:
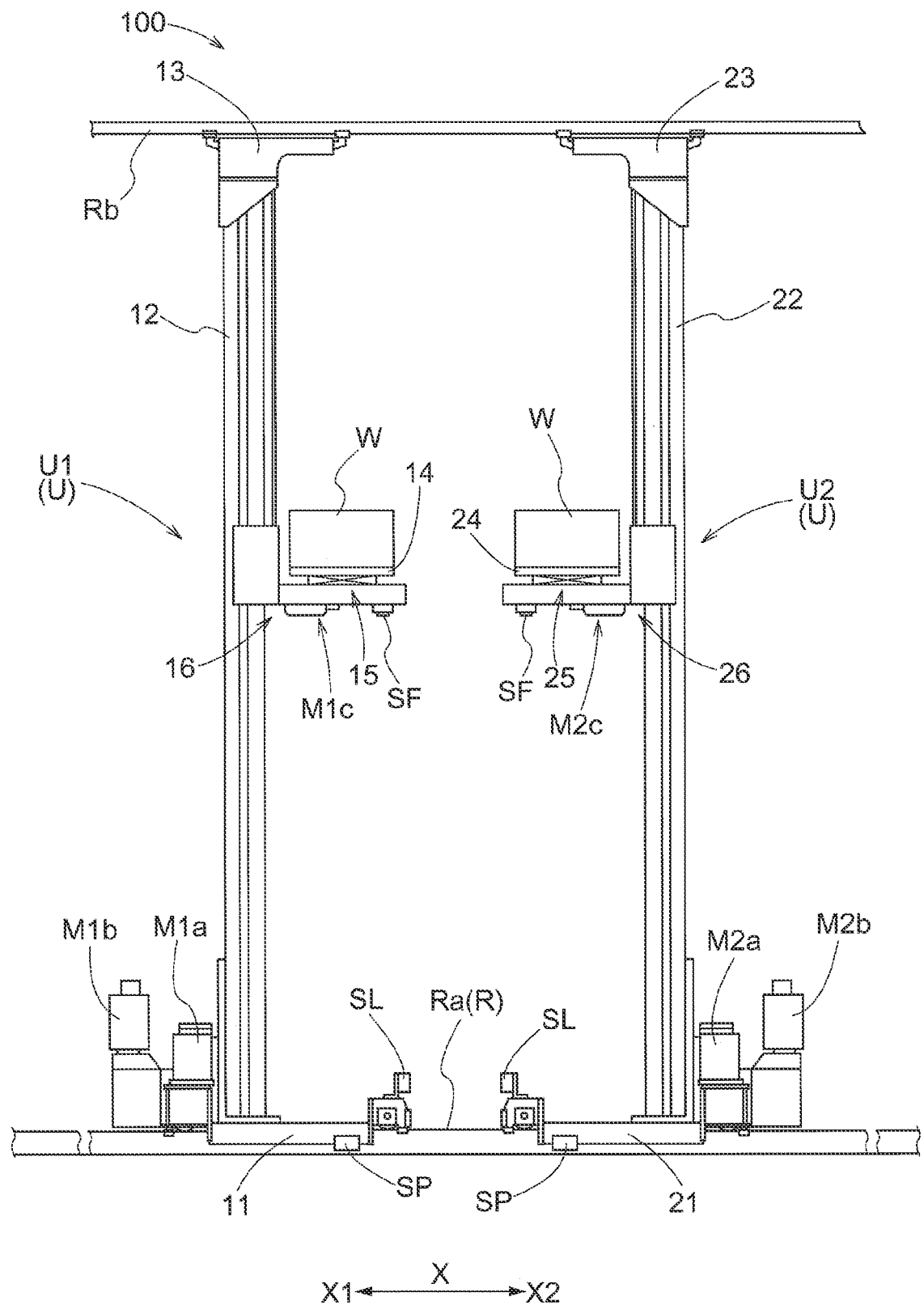
FIG. 3 is a side view of transport units.

As shown in FIGS. 1 to 3, the first transport unit U1 includes a first travel portion 11 that travels along the travel path R, a first holding portion 14 that holds the article W, and a first transfer portion 15 that transfers the article W between the first holding portion 14 and the storage section 30 among the plurality of storage sections 30 that serves as a transfer target location. Similarly, the second transport unit U2 includes a second travel portion 21, a second holding portion 24, and a second transfer portion 25. In the present embodiment, each of the first travel portion 11 and the second travel portion 21 corresponds to a "travel portion". Each of the first holding portion 14 and the second holding portion 24 corresponds to a "holding portion". Each of the first transfer portion 15 and the second transfer portion 25 corresponds to a "transfer portion".

The two travel portions, namely, the first travel portion 11 and the second travel portion 21 are configured to be unable to pass each other on the travel path R. In the present embodiment, the travel path R includes a travel rail Ra extending along the traveling direction X. The first travel portion 11 and the second travel portion 21 are configured to travel on the same travel rail Ra. Note that, in the present example, a guide rail Rb extending along the traveling direction X is disposed above the travel rail Ra (see FIG. 3). The guide rail Rb guides an upper portion of each of the first transport unit U1 and the second transport unit U2.

As shown in FIG. 3, in the present embodiment, the first transport unit U1 includes a first mast 12 provided extending upward from the first travel portion 11, a first guided portion 13 that is provided at an upper end of the first mast 12, and is guided along the traveling direction X by the guide rail Rb, and a first elevation portion 16 that is supported on the first mast 12, and is raised and lowered along the first mast 12. The first elevation portion 16 supports the first holding portion 14 and the first transfer portion 15. In the present example, the first elevation portion 16 is provided protruding to the traveling direction-second side X2 relative to the first mast 12.

The first transport unit U1 includes a first travel driving portion M1a that causes the first travel portion 11 to travel along the travel path R, and a first elevation driving portion M1b that raises and lowers the first elevation portion 16 along the first mast 12. With such a configuration, the first transport unit U1 can move the first holding portion 14 capable of holding the article W, to a position corresponding to each of the plurality of storage sections 30 arranged along the traveling direction X and the up-down direction. In the present example, the first transfer portion 15 is configured to be capable of transferring the article W held on the first holding portion 14 to the storage section 30 and retrieving the article W stored in the storage section 30 by causing the first holding portion 14 to extend and retract to and from the first elevation portion 16 along the arrangement direction Y.

In the present embodiment, the first transfer portion 15 includes a first transfer driving portion M1c that drives the first holding portion 14. For example, the first transfer driving portion M1c includes an endless body coupled to the first holding portion 14, a rotational body around which the endless body is wrapped, and a motor that rotationally drives the rotational body. In the present example, the first holding portion 14 is configured such that the article W is placed thereon, and the first holding portion 14 is extended and retracted in the arrangement direction Y by the first transfer portion 15. That is, the first holding portion 14 constitutes a part of a fork-type transfer machine.

Similarly to the first transport unit U1, the second transport unit U2 includes a second mast 22, a second guided portion 23, a second elevation portion 26, a second travel driving portion M2a, and a second elevation driving portion M2b. Also, similarly to the first transfer portion 15, the second transfer portion 25 includes a second transfer driving portion M2c that drives the second holding portion 24.

In the present embodiment, each of the first transport unit U1 and the second transport unit U2 includes a self-position detection portion SP that detects its current position. The self-position detection portion SP is provided in each of the first travel portion 11 and the second travel portion 21. In the present example, the self-position detection portion SP provided in the first transport unit U1 detects the distance from a first home position HP1 (see FIG. 2) set in an end region of the travel path R on the traveling direction-first side X1 to the first travel portion 11. This makes it possible to detect the current position of the first transport unit U1 on the travel path R. Similarly, the self-position detection portion SP provided in the second transport unit U2 detects the distance from a second home position HP2 (see FIG. 2) set in an end region of the travel path R on the traveling direction-second side X2 to the second travel portion 21. This makes it possible to detect the current position of the second transport unit U2 on the travel path R. The self-position detection portion SP can be formed using a rotary encoder, for example. Note that as shown in FIG. 2, the first home position HP1 is a standby position of the first transport unit U1 when the first transport unit U1 is not operated, and is set at a position that does not overlap the article storage racks 3 as viewed in the arrangement direction Y. The second home position HP2 is a standby position of the second transport unit U2 when the second transport unit U2 is not operated, and is set at a position that does not overlap the article storage racks 3 as viewed in the arrangement direction Y.

In the present embodiment, the article transport facility 100 includes a relative distance detection portion SL that detects the relative distance between the two transport units U in the traveling direction X. In the present example, both the first transport unit U1 and the second transport unit U2 include the relative distance detection portion SL. The relative distance detection portion SL of the first transport unit U1 is provided in the first travel portion 11. The relative distance detection portion SL of the second transport unit U2 is provided in the second travel portion 21. Each relative distance detection portion SL can be formed by a laser range finder, for example. The relative distance detection portion SL provided in the first travel portion 11 detects the distance from the first travel portion 11 to the second travel portion 21 by emitting laser light toward the second travel portion 21, and receiving the laser light reflected by the second travel portion 21. The relative distance detection portion SL provided in the second travel portion 21 detects the distance from the second travel portion 21 to the first travel portion 11 by emitting laser light toward the first travel portion 11, and receiving the laser light reflected by the first travel portion 11.

Further, in the present embodiment, the article transport facility 100 includes a foreign object detection portion SF that detects a foreign object F (see FIG. 8) present on the travel path R. Here, both the first transport unit U1 and the second transport unit U2 are provided with the foreign object detection portion SF. The detection range of the foreign object detection portion SF of the first transport unit U1 is an area adjacent on the traveling direction-second side X2 relative to the first travel portion 11. For example, the foreign object detection portion SF can be formed by a camera. In the example shown in FIG. 3, the foreign object detection portion SF of the first transport unit U1 is provided in the first elevation portion 16 protruding from the first mast 12 to the traveling direction-second side X2, and an area below the first elevation portion 16 is set as the detection range of the foreign object detection portion SF. This makes it possible to detect any foreign object F present in an area adjacent on the traveling direction-second side X2 relative to the first travel portion 11. The foreign object detection portion SF of the second transport unit U2 is provided in the second elevation portion 26 protruding from the second mast 22 to the traveling direction-first side X1, and an area below the second elevation portion 26 is set as the detection range of the foreign object detection portion SF. This makes it possible to detect any foreign object F present in an area adjacent on the traveling direction-first side X1 relative to the second travel portion 21.

Control Configuration of Article Transport Facility

Next, a control configuration of the article transport facility 100 will be described.

Figure 4:
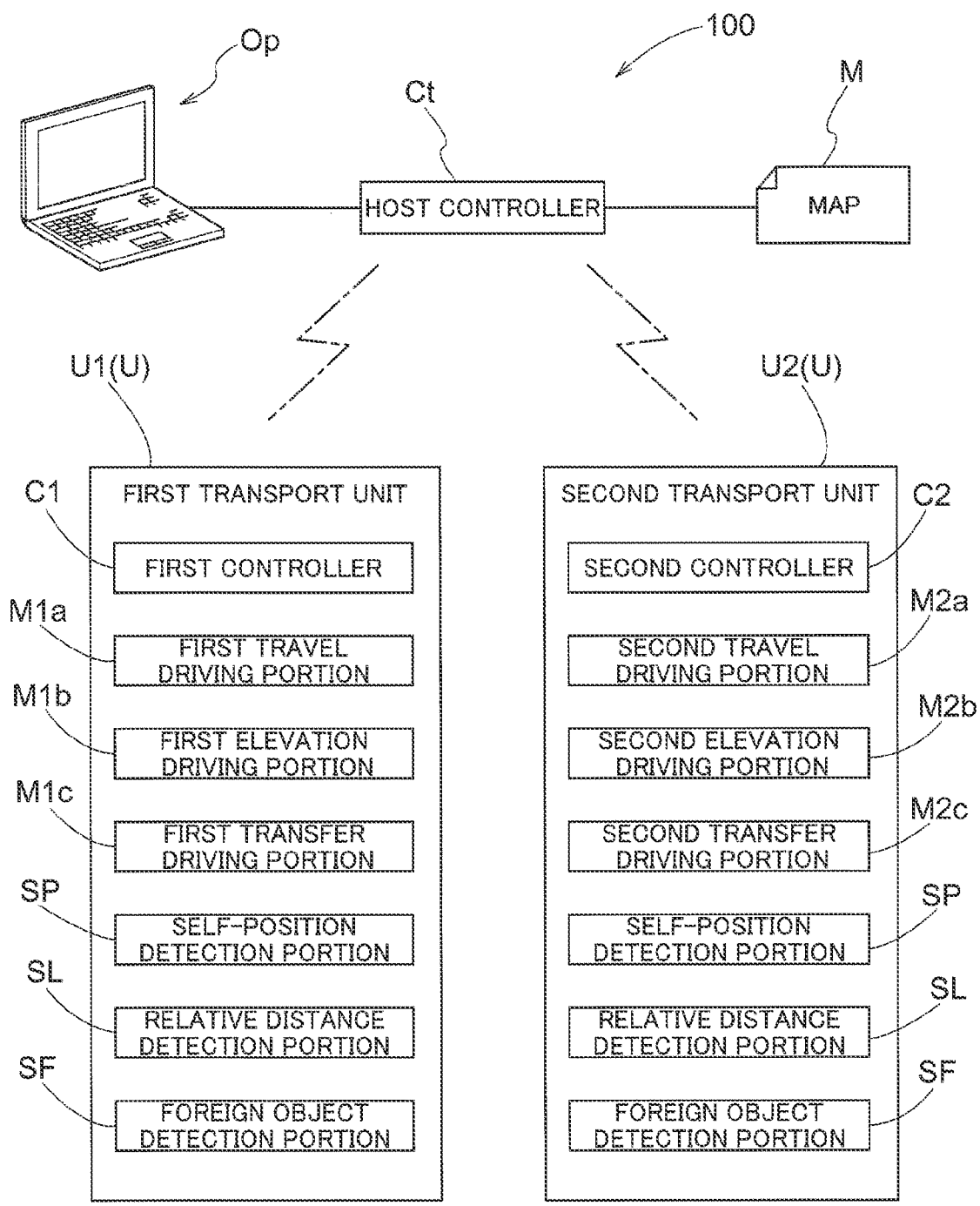
FIG. 4 is a control block diagram of the article transport facility.

As shown in FIG. 4, the first transport unit U1 includes a first controller C1 that controls the operation of the first transport unit U1. The second transport unit U2 includes a second controller C2 that controls the operation of the second transport unit U2. Also, the article transport facility 100 includes a host controller Ct that controls both of the two transport units U. More specifically, the host controller Ct is configured to control the first transport unit U1 by transmitting an instruction to the first controller C1, and to control the second transport unit U2 by transmitting an instruction to the second controller C2. In the present embodiment, the host controller Ct corresponds to a "control device".

The host controller Ct performs overall management of storage, movement, and so forth of the plurality of articles W in the facility. The host controller Ct is configured to be capable of wired or wireless communication with the first controller C1 and the second controller C2. The host controller Ct, the first controller C1, and the second controller C2 each include, for example, a processor such as a microcomputer and a peripheral circuit such as a memory. Also, various functions are implemented by these pieces of hardware working cooperatively with a program executed on a processor such as a computer.

In the present embodiment, the article transport facility 100 includes an operation portion Op for inputting various instructions into the host controller Ct. For example, as a result of an operator operating the operation portion Op to input an instruction, the host controller Ct controls the first transport unit U1 and the second transport unit U2 based on the input instruction. The operation portion Op includes, for example, an input device through which an instruction can be input, such as a keyboard and a touch panel.

The first controller C1 receives the instruction from the host controller Ct, and controls the operation of the first transport unit U1. Specifically, the first controller C1 controls at least one of the first travel driving portion M1a, the first elevation driving portion M1b, and the first transfer driving portion M1c. In addition, the first controller C1 transmits, to the host controller Ct, information on the current position of the first transport unit U1 detected by the self-position detection portion SP, information on the relative distance between the first transport unit U1 and the second transport unit U2 detected by the relative distance detection portion SL, and information on a foreign object F (see FIG. 8) present on the travel path R detected by the foreign object detection portion SF.

The second controller C2 receives the instruction from the host controller Ct, and controls the operation of the second transport unit U2. Specifically, the second controller C2 controls at least one of the second travel driving portion M2a, the second elevation driving portion M2b, and the second transfer driving portion M2c. In addition, the second controller C2 transmits, to the host controller Ct, information on the current position of the second transport unit U2 detected by the self-position detection portion SP, information on the relative distance between the second transport unit U2 and the first transport unit U1 detected by the relative distance detection portion SL, and information on a foreign object F (see FIG. 8) present on the travel path R detected by the foreign object detection portion SF.

In the present embodiment, the host controller Ct creates a control map M indicating the storage sections 30 to which the article W can be transferred, among the plurality of storage sections 30 provided in the article storage rack 3, and controls each of the two transport units U based on the control map M. FIGS. 5 to 9 show images of the control maps M created by the host controller Ct.

Here, in the article transport facility 100, articles W are transported using the two transport units U that travel along the ended travel path R. Therefore, when an abnormality that makes it impossible to continue transport has occurred in one of the two transport units U, the abnormality also affects the other transport unit U. The article transport facility 100 according to the present disclosure is configured to be able to transport the articles W according to various situations even in such cases where no abnormality has occurred in either of the two transport units U, and where an abnormality has occurred in one of the two transport units U. In the following, controls performed in the article transport facility 100 will be described, in which a transport unit U that has stopped abnormally due to occurrence of an abnormality is denoted as an abnormal unit Ua, and a transport unit U that can be operated normally is denoted as a normal transport unit Un.

As described above, FIGS. 5 to 9 show images of control maps M created by the host controller Ct, and the host controller Ct controls the transport unit U based on the control maps M. In each of FIGS. 5 to 9, the matrix shown on the upper side represents an article storage rack 3 as viewed in the arrangement direction Y. Here, a plurality of storage sections 30 arranged in a grid along the traveling direction X and the up-down direction are shown. In each of FIGS. 5 to 9, a schematic view of the travel path R and the transport units U in a plan view is shown on the lower side of the matrix (article storage rack 3). In these drawings, the position of the article storage rack 3 in the traveling direction X and the position of the transport unit U in the traveling direction X correspond to each other. In the present example, a pair of article storage racks 3 are disposed opposing each other with the travel path R interposed therebetween in the arrangement direction Y as shown in FIG. 1. However, in FIGS. 5 to 9, one of the two article storage racks 3 is shown.

Figure 5:
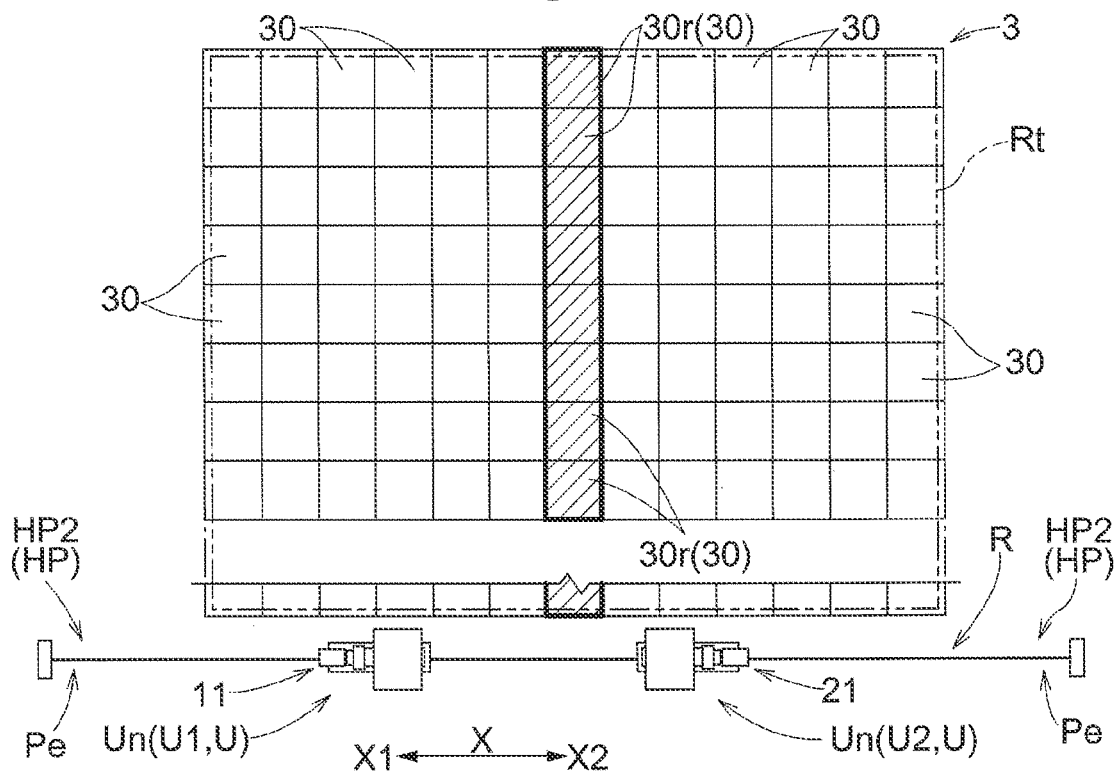
FIG. 5 is a control map used when executing a normal operation control.

As shown in FIG. 5, the host controller Ct is capable of executing a normal operation control in which the two normal units Un are operated so as not to interfere with each other. In the present embodiment, in the normal operation control, the host controller Ct sets some of the storage sections 30 of the article storage rack 3 as relay storage sections 30r serving as relay locations for delivering and receiving the articles W between the two transport units U. In the present example, the host controller Ct sets the storage sections 30 provided in an intermediate region of the article storage rack 3 in the traveling direction X as the relay storage sections 30r. In the present example, all of the storage sections 30 arranged in one column in the up-down direction at a central position of the article storage rack 3 in the traveling direction X are set as the relay storage sections 30r. In FIGS. 5 to 9, the range surrounded by the bold frame in a portion of the article storage rack 3 indicates the center of the article storage rack 3 in the traveling direction X. Also, in the case where the bold frame range is hatched, it is indicated that a plurality of storage sections 30 in the bold frame range are set as the relay storage sections 30r.

The relay storage sections 30r are used as follows. For example, when an article W transported by the first transport unit U1 is transferred to a storage section 30 disposed in the traveling direction-second side X2 relative to the relay storage section 30r, first, the first transport unit U1 transfers the article W to a relay storage section 30r. The second transport unit U2 retrieves the article W that has been stored in the relay storage section 30r in this manner, and transfers the article W to the intended storage section 30.

In the normal operation control, the host controller Ct sets a transferable range Rt in which the articles W can be transferred by either of the two normal units Un to be the entire range of the article storage rack 3. That is, in the normal operation control, all of the storage sections 30 of the article storage rack 3 can be the transfer target locations.

Figure 6:
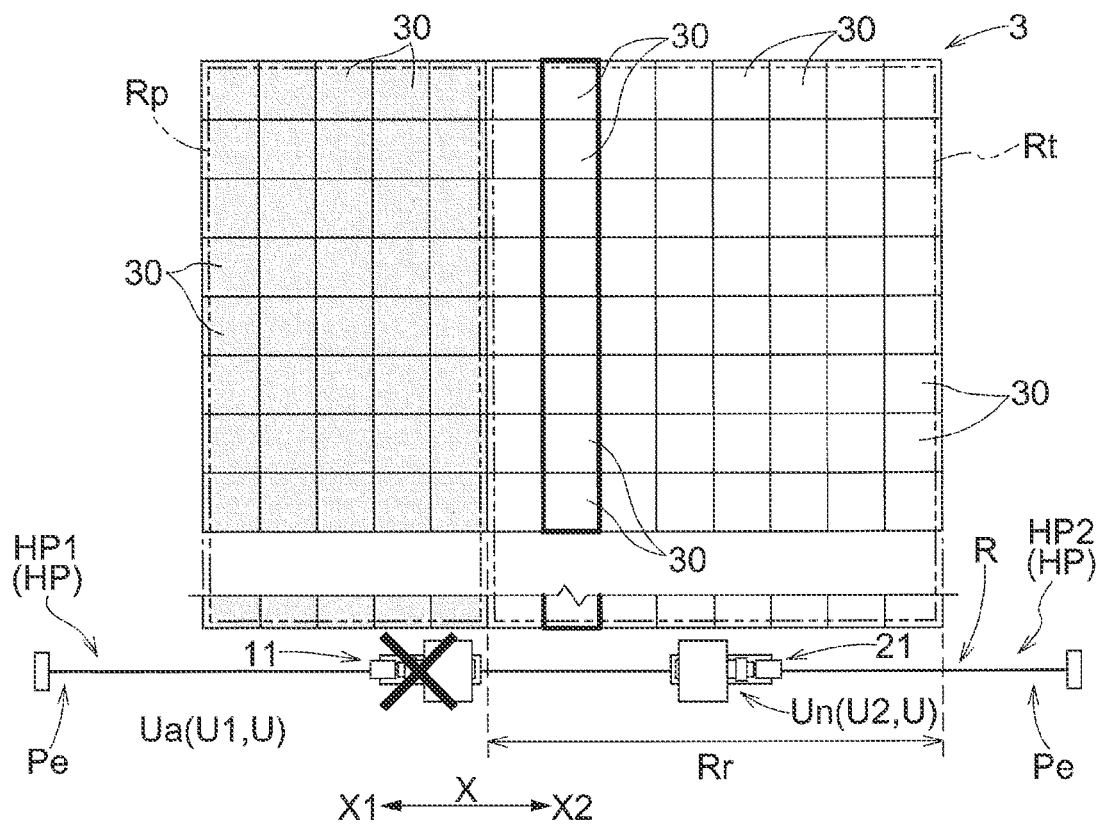
FIG. 6 is a control map used when executing a first abnormality control.

As shown in FIGS. 6 and 7, the host controller Ct is capable of executing a first abnormality control, a retraction control, and a second abnormality control when one of the two transport units U is an abnormal unit Ua, and the other is a normal unit Un. In the illustrated example, the first transport unit U1 is the abnormal unit Ua, and the second transport unit U2 is the normal unit Un. However, conversely to the above, the second transport unit U2 may be the abnormal unit Ua, and the first transport unit U1 is the normal unit Un.

FIG. 6 shows a control map M used when the host controller Ct executes the first abnormality control. The first abnormality control is a control in which the transferable range Rt in which the normal unit Un can transfer the article W to and from the storage section 30 without interfering with the abnormal unit Ua is set to a partial range of the article storage rack 3, and the normal unit Un is operated using one or more of the storage sections 30 included in the transferable range Rt as the transfer target locations. In the first abnormality control, the host controller Ct sets the range of the article storage rack 3 excluding the transferable range Rt as a transfer prohibition range Rp in which the transfer of the articles W is prohibited. In the article storage rack 3 shown in FIG. 6, the colored range is the transfer prohibition range Rp, and the uncolored range is the transferable range Rt.

In the present embodiment, the host controller Ct sets a travelable range Rr in which the normal unit Un can travel on the travel path R without interfering with the abnormal unit Ua, based on the current position of the normal unit Un and the current position of the abnormal unit Ua. Also, the range of the transferable range Rt in the traveling direction X is set based on the travelable range Rr. That is, within the travelable range Rr, the range in which all of the storage sections 30 arranged in the up-down direction are provided is set as the transferable range Rt. The current position of the normal unit Un can be detected by the self-position detection portion SP provided in the normal unit Un. Here, ordinarily, the current position of the abnormal unit Ua can be detected by the self-position detection portion SP provided in the abnormal unit Ua. However, for example, when the type of the abnormality that has occurred in the abnormal unit Ua is unknown, there is the possibility that an abnormality also has occurred in the self-position detection portion SP. Therefore, the reliability of the self-position detection portion SP provided in the abnormal unit Ua is low. For this reason, in the present embodiment, the host controller Ct detects an abnormal stop position Ps (current position) at which the abnormal unit Ua has stopped, based on the current position of the normal unit Un and a result of detection by the relative distance detection portion SL. Also, the host controller Ct sets the travelable range Rr in which the normal unit Un can travel on the travel path R without interfering with the abnormal unit Ua, based on the abnormal stop position Ps. That is, in the present embodiment, using the relative distance detection portion SL provided in the normal unit Un that operates normally, the current position (abnormal stop position Ps) of the abnormal unit Ua is detected from the positional relationship between the normal unit Un whose current position has already been known, and the abnormal unit Ua. Accordingly, even when an abnormality has occurred in one of the two transport units U, the respective current positions of the two transport units U can be accurately detected.

Here, when an abnormality that makes it impossible to continue transport has occurred in one of the two transport units U, the article W cannot be delivered or received between the two transport units U, and the relay storage sections 30r no longer function as the relay storage sections. Therefore, in the present embodiment, in the first abnormality control, the host controller Ct cancels the setting of the relay storage section 30r (see FIG. 5). Consequently, by cancelling the setting of the relay storage sections 30r, the host controller Ct can use the storage sections 30 that have been set as the relay storage sections 30r as normal storage sections 30 for storing the article W, and the storage efficiency of the article storage rack 3 can be improved accordingly. In the present embodiment, when the range of the article storage rack 3 in which the relay storage sections 30r are set is on the normal unit Un side (in the illustrated example, the traveling direction-second side X2) relative to the abnormal unit Ua in the traveling direction X, the host controller Ct includes, in the transferable range Rt, the storage sections 30 that have been set as the relay storage sections 30r.

FIG. 7 shows a control map M used when the host controller Ct executes the second abnormality control after executing the retraction control. The retraction control is a control for moving the abnormal unit Ua to a retracted position Pe that is set in an end region of the travel path R in the traveling direction X. In the present embodiment, the retracted position Pe is set at a position that does not interfere with the normal unit Un when the normal unit Un is operated using a plurality of the storage sections 30 included in the entire region of the article storage rack 3 as the transfer target locations. Here, the retracted position Pe is set at a position that does not overlap the article storage rack 3 as viewed in the arrangement direction Y. In the present embodiment, the above-described home position HP of the transport unit U is set as the retracted position Pe. Specifically, when the first transport unit U1 is an abnormal unit Ua, the first home position HP1 is set as the retracted position Pe of the abnormal unit Ua. When the second transport unit U2 is an abnormal unit Ua, the second home position HP2 is set as the retracted position Pe of the abnormal unit Ua.

In the retraction control, the movement of the abnormal unit Ua to the retracted position Pe is performed using the driving force of the travel portion of the abnormal unit Ua wherever possible. Specifically, when the travel portion of the abnormal unit Ua, here, the first travel portion 11 of the first transport unit U1, operates normally, the host controller Ct instructs the first transport unit U1, which is the abnormal unit Ua, so as to move to the retracted position Pe using the driving force of the first travel portion 11. In the present embodiment, after starting execution of the first abnormality control, the host controller Ct executes the retraction control during execution of the first abnormality control. Then, after the abnormal unit Ua has been moved to the retracted position Pe, the host controller Ct proceeds to the second abnormality control in succession to the first abnormality control. In the present example, after determining that the abnormal unit Ua has been moved to the retracted position Pe, the host controller Ct ends the first abnormality control, and starts the second abnormality control. Accordingly, it is possible to suppress the occurrence of a period during which the transport unit U is not operated, thus making it possible to reduce the reduction in the overall operating ratio of the facility.

The second abnormality control is a control in which, in a state in which the abnormal unit Ua is retracted to the retracted position Pe, the normal unit Un is operated using a plurality of the storage sections 30 included in the entire range of the article storage rack 3 as the transfer target locations. In the present embodiment, in the second abnormality control, the host controller Ct cancels the setting of the relay storage section 30r (see FIG. 5) as in the case of the above-described first abnormality control. Accordingly, in the second abnormality control, the host controller Ct sets the entire range of the article storage rack 3 as the transferable range Rt.

Here, in the present embodiment, when one of the two transport units U has stopped abnormally, the host controller Ct performs an executability determination to determine whether or not the first abnormality control is executable, and if the host controller Ct determines that the first abnormality control is executable, the host controller Ct automatically executes the first abnormality control.

As previously described with reference to FIG. 3, the detection range of the foreign object detection portion SF provided in the first transport unit U1 is an area adjacent on the traveling direction-second side X2 relative to the first travel portion 11, and the detection range of the foreign object detection portion SF provided in the second transport unit U2 is an area adjacent on the traveling direction-first side X1 relative to the second travel portion 21. Also, for example, when one of the first transport unit U1 and the second transport unit U2 has become an abnormal unit Ua, the normal unit Un detects the presence or absence of a foreign object F using the foreign object detection portion SF, while slowly traveling toward the abnormal unit Ua within a range that the normal unit Un does not interference with the abnormal unit Ua. Accordingly, when any foreign object F is present on the travel path R, the foreign object F can be detected over the entire range on the normal unit Un side relative to the abnormal unit Ua. Thus, the article transport facility 100 includes the foreign object detection portion SF that detects any foreign object F present on the travel path R on the normal unit Un side relative to the abnormal unit Ua, when an abnormality has occurred in one of the two transport units U.

In the present embodiment, conditions for determining, in the above-described executability determination, that the first abnormality control is executable include a condition that the foreign object F (see FIG. 8) is not detected by the foreign object detection portion SF, and a condition that the position of the abnormal unit Ua is detected. That is, in the present embodiment, the host controller Ct executes the first abnormality control on both the condition that the foreign object F (see FIG. 8) is not detected by the foreign object detection portion SF, and the condition that the position of the abnormal unit Ua is detected.

As shown in FIG. 8, for example, when the presence of a foreign object F on the normal unit Un side relative to the abnormal unit Ua (here, the traveling direction-second side X2 relative to the first transport unit U1) is detected, the host controller Ct sets the entire range of the article storage rack 3 as the transfer prohibition range Rp, and does not execute the first abnormality control. The foreign object F may be, for example, an article W that has been dropped during transport. Although FIG. 8 shows the article W as an example of the foreign object F, the foreign object F may be a device or a tool used in the facility. In the present embodiment, when the foreign object F is present on a side of the abnormal unit Ua opposite to the normal unit Un on the travel path R, the host controller Ct determines that the transport of the article W by the normal unit Un is possible, and executes the first abnormality control. For example, when the first transport unit U1 is the abnormal unit Ua, the operation of the second transport unit U2 on the traveling direction-second side X2 relative to the first transport unit U1 is not affected when the foreign object F is present on the traveling direction-first side X1 relative to the first transport unit U1. Therefore, the host controller Ct executes the first abnormality control.

Figure 9:
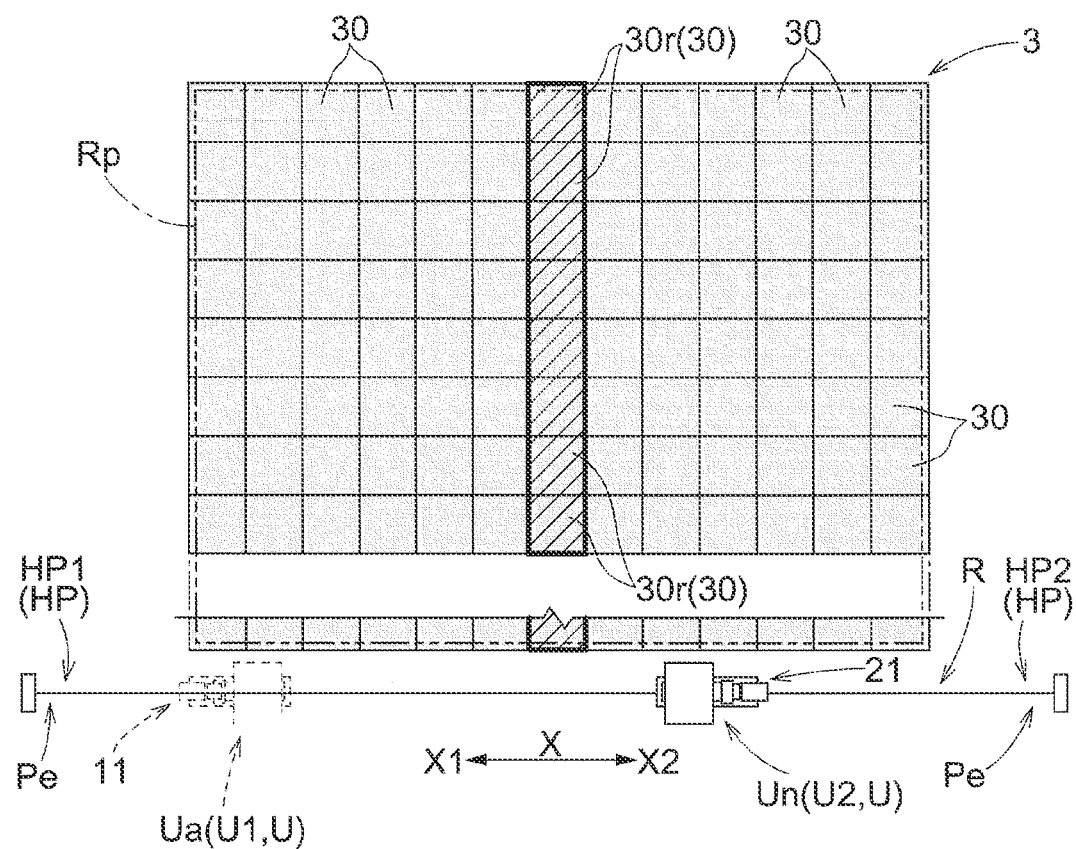
FIG. 9 is a control map used when the current position of an abnormal unit cannot be ascertained.

As shown in FIG. 9, for example, when the position of the abnormal unit Ua is not appropriately detected, the host controller Ct sets the entire range of the article storage rack 3 as the transfer prohibition range Rp, and does not execute the first abnormality control. When the position of the abnormal unit Ua is not appropriately detected, the current position of the abnormal unit Ua is uncertain. If the normal unit Un is operated in this state, there is the possibility that the normal unit Un may interfere with the abnormal unit Ua. By setting a condition that the position of the abnormal unit Ua is detected as one of the conditions for executing the first abnormality control, it is possible to avoid interference between the normal unit Un and the abnormal unit Ua as described above.

Figure 10:
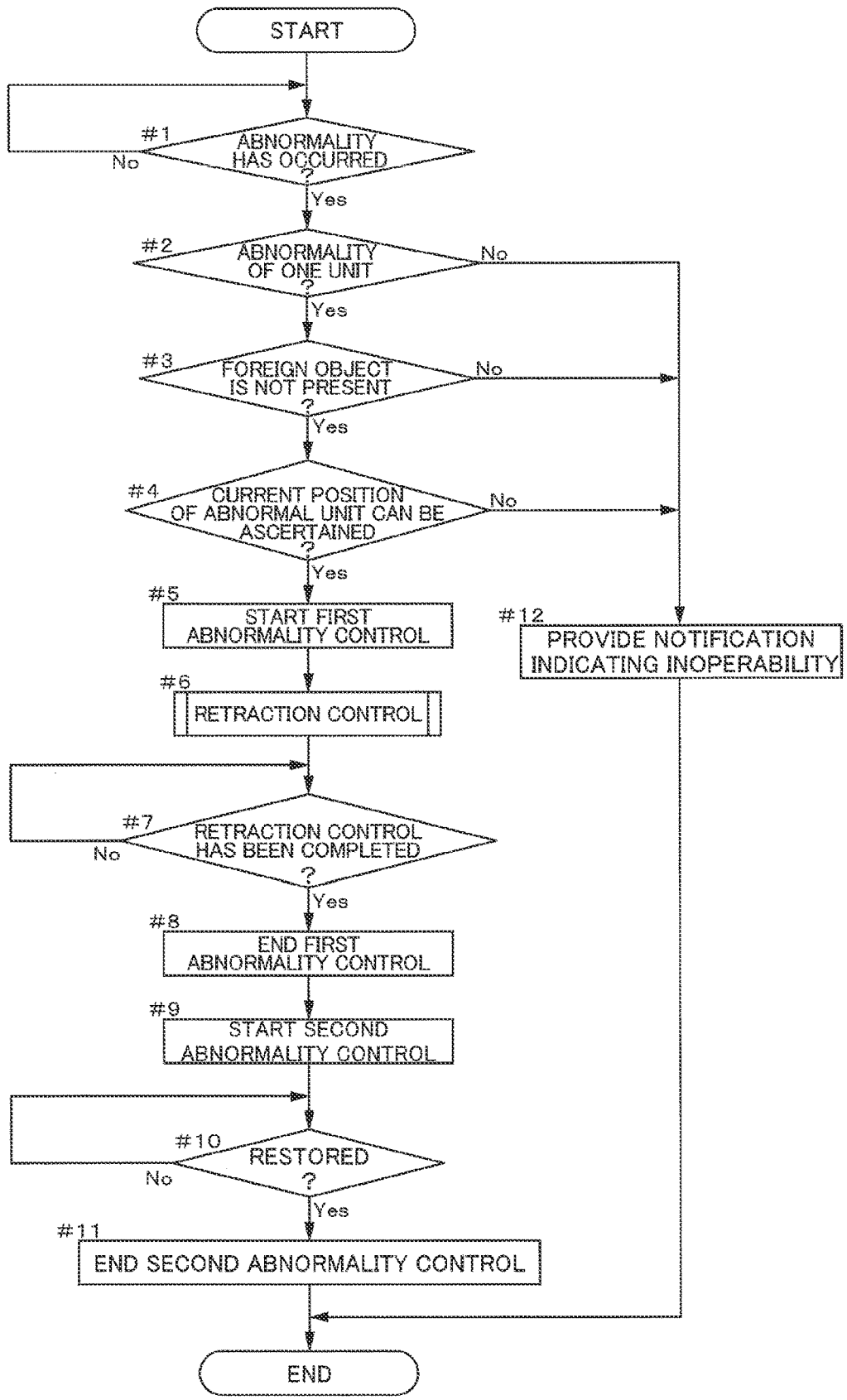
FIG. 10 is a flowchart illustrating a control procedure performed in the article transport facility.

Next, a procedure for the controls executed by the host controller Ct will be described with reference to the flowchart shown in FIG. 10.

First, the host controller Ct determines whether or not an abnormality has occurred in the transport unit U (step #1). This determination is performed based on a notification of abnormality from the first controller C1 of the first transport unit U1 and the second controller C2 of the second transport unit U2. If the host controller Ct determines that an abnormality has occurred in the transport unit U (step #1: Yes), the host controller Ct determines whether or not the abnormality is an abnormality of one of the two transport units U (step #2). If the host controller Ct determines that the abnormality is an abnormality of one transport unit U (step #2: Yes), the host controller Ct determines whether or not any foreign object F is present on the travel path R (step #3). The determination of the presence or absence of the foreign object F is performed based on a result of detection by the foreign object detection portion SF of the normal unit Un, as described above. If the host controller Ct determines that no foreign object F is present on the travel path R (step #3: Yes), the host controller Ct determines whether or not the current position of the abnormal unit Ua can be ascertained (step #4). This determination is performed based on whether or not the current position of the abnormal unit Ua has been detected based on the current position of the normal unit Un and a result of detection by the relative distance detection portion SL, as described above. If the host controller Ct determines that the current position of the abnormal unit Ua can be ascertained (step #4: Yes), the host controller Ct starts the first abnormality control (step #5). Note that if the determination made by the host controller Ct is "No" in any of steps #2, #3, and #4, the host controller Ct provides a notification indicating that the facility is inoperable (step #12), and ends the routine.

After starting the first abnormality control, the host controller Ct executes the retraction control (step #6). The details of the retraction control will be described later with reference to FIG. 11. Thereafter, the host controller Ct determines whether or not the retraction control has been completed (step #7). If the host controller Ct determines that the retraction control has been completed (step #7: Yes), the host controller Ct ends the first abnormality control (step #8), and starts the second abnormality control (step #9). Thereafter, the host controller Ct determines whether or not the abnormal unit Ua has been restored (step #10). This determination is performed based on a notification indicating that the abnormal unit Ua has been restored, the notification being provided by the controller (the first controller C1 or the second controller C2) of the transport unit U that has been the abnormal unit Ua before being restored, or based on an input into the operation portion Op from the operator. If the host controller Ct determines that the abnormal unit Ua has been restored (step #10: Yes), the host controller Ct ends the second abnormality control (step #11), and ends the routine.

Figure 11:
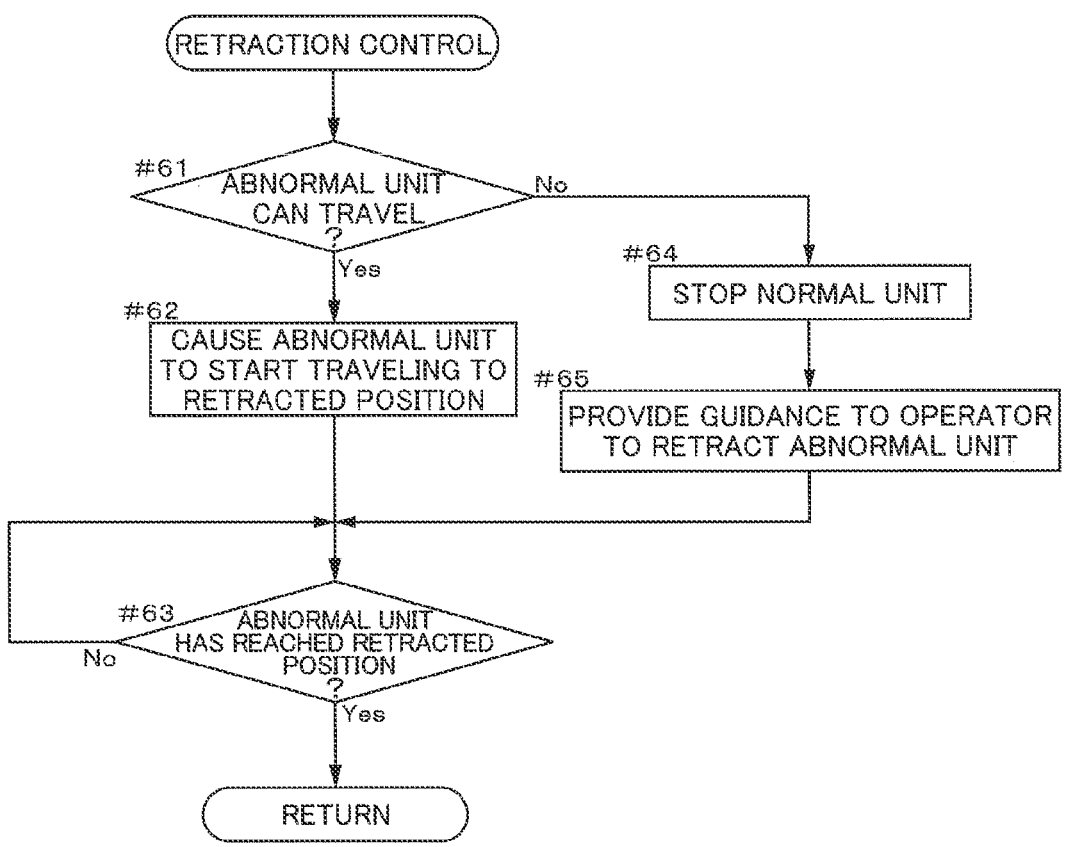
FIG. 11 is a flowchart illustrating a procedure for the retraction control.

In the retraction control (step #6), as shown in FIG. 11, the host controller Ct first determines whether or not the abnormal unit Ua can travel (step #61). If the abnormal unit Ua can travel (step #61: Yes), the host controller Ct causes the abnormal unit Ua to start traveling to the retracted position Pe (step #62). Then, when the abnormal unit Ua has reached the retracted position Pe (step #63: Yes), the retraction control is completed. On the other hand, if the abnormal unit Ua cannot travel (step #61: No), the host controller Ct stops the operation of the normal unit Un in the first abnormality control (step #64). That is, the host controller suspends the first abnormality control. Then, the host controller Ct provides a guidance to guide the operator to move the abnormal unit Ua to the retracted position Pe (step #65). This guidance is provided, for example, through display using a display portion, audio output using an audio output portion, or the like. In this case, the movement of the abnormal unit Ua to the retracted position Pe is performed using a driving force that is separate from the driving force of the travel portion of the abnormal unit Ua. Here, "driving force that is separate" is provided by a device, the operator, or the like other than the abnormal unit Ua. For example, the normal unit Un may be coupled to the abnormal unit Ua, and the abnormal unit Ua may be moved using the driving force of the travel portion of the normal unit Un. Alternatively, the operator may enter the travel path R, and push and move the abnormal unit Ua to the retracted position Pe. Then, when the abnormal unit Ua has reached the retracted position Pe (step #63: Yes), the retraction control is completed. Preferably, the determination as to whether or not the abnormal unit Ua has reached the retracted position Pe is performed, for example, by providing a sensor for detecting that the abnormal unit Ua has reached the retracted position Pe, and performing the determination based on a result of detection by the sensor. This determination may also be performed based on a notification indicating that the abnormal unit Ua has been moved to the retracted position Pe, the notification being provided by the controller (the first controller C1 or the second controller C2) of the abnormal unit Ua, or based on an input operation indicating the completion of movement to the retracted position Pe performed by the operator using the operation portion Op.

Second Embodiment

Next, an article transport facility 100 according to a second embodiment will be described. The present embodiment is different from the above first embodiment with regard to the conditions for executing the first abnormality control. The following description focuses mainly on differences from the above first embodiment. The aspects that are not specifically described are the same as those of the above first embodiment.

In the present embodiment, when one of the two transport units U has stopped abnormally, the host controller Ct provides a notification indicating the stopping, and enters a state in which the host controller Ct can receive an execution instruction of the first abnormality control. The host controller Ct executes the first abnormality control when the execution instruction is received. In the present example, the host controller Ct receives the execution instruction via the operation portion Op (see FIG. 4). Specifically, as a result of the operator operating the operation portion Op to input an execution instruction, the host controller Ct receives the execution instruction, and executes the first abnormality control. In the case of receiving the execution instruction, it is preferable that a reception screen for an execution instruction of the first abnormality control is displayed on a display screen of the operation portion Op.

Figure 12:
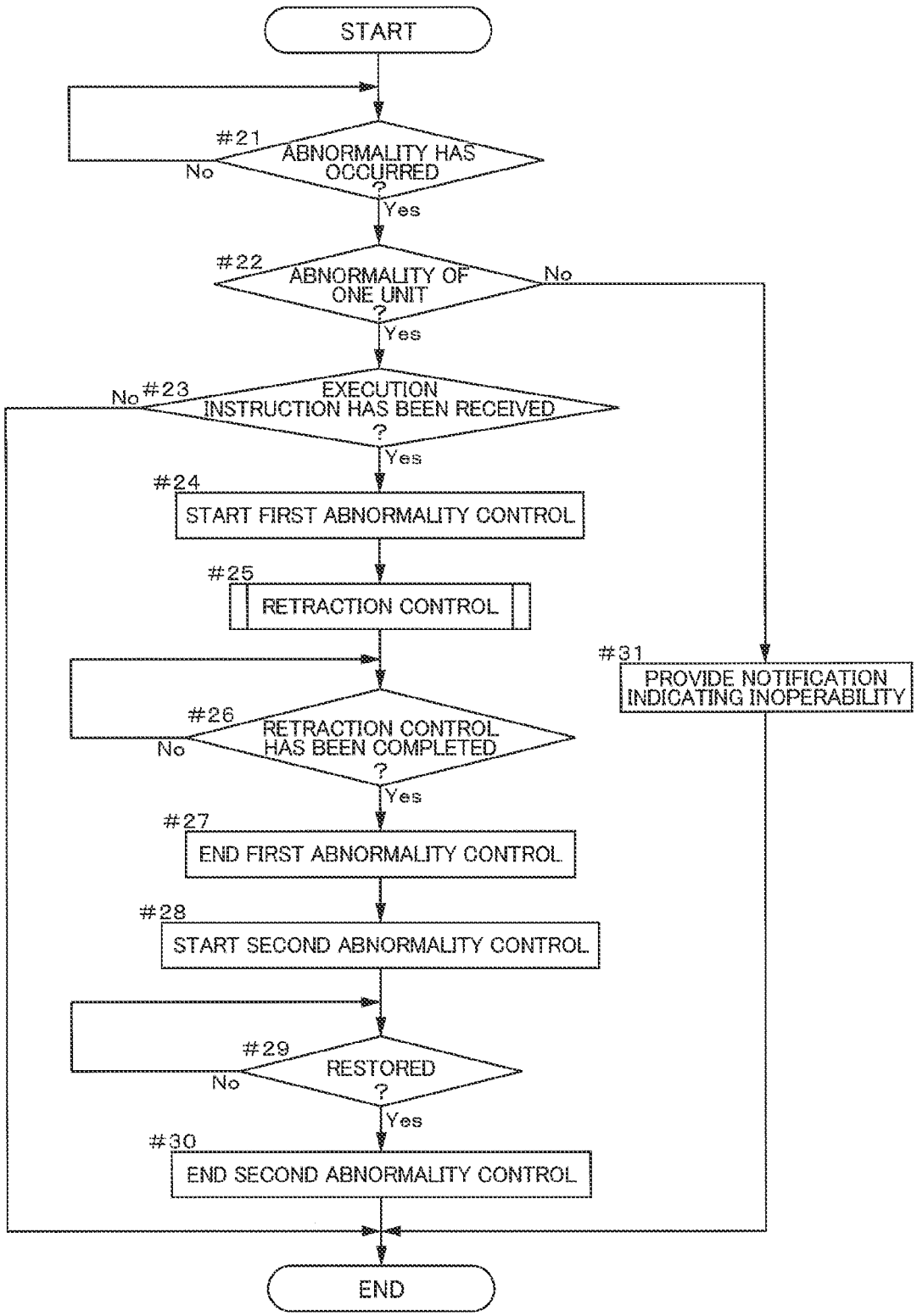
FIG. 12 is a flowchart illustrating a control procedure performed in an article transport facility according to a second embodiment.

Next, a procedure for the controls executed by the host controller Ct in the present embodiment will be described with reference to the flowchart shown in FIG. 12.

The host controller Ct determines whether or not an abnormality has occurred in the transport unit U (step #21). If the host controller Ct determines that an abnormality has occurred in the transport unit U (step #21: Yes), the host controller Ct determines whether or not the abnormality is an abnormality of one of the two transport units U (step #22). If the host controller Ct determines that the abnormality is not an abnormality of one transport unit, or in other word, determines that the two transport units U are abnormal (step #22: No), the host controller Ct provides a notification indicating that the facility is inoperable (step #31), and ends the routine. If the host controller Ct determines that the abnormality is an abnormality of one transport unit (step #22: Yes), the host controller Ct enters a state in which host controller Ct can receive an execution instruction of the first abnormality control, and determines whether or not an execution instruction is received (step #23). Then, if the host controller Ct determines that an execution instruction is received (step #23: Yes), the host controller Ct starts the first abnormality control (step #24). On the other hand, if no execution instruction is received (step #23: No), the host controller Ct ends the routine. The routine carried out after starting the first abnormality control is the same as that of the above first embodiment, and therefore the description thereof has been omitted.

Other Embodiments

Next, other embodiments of the article transport facility will be described.

(1) The above embodiment has described an example in which, after starting execution of the first abnormality control, the host controller Ct executes the retraction control during execution of the first abnormality control. However, the present disclosure is not limited to such an example, and the host controller Ct may execute the retraction control after the first abnormality control has ended.

(2) The above embodiment has described an example in which the host controller Ct detects an abnormal stop position Ps (current position), which is a position at which the abnormal unit Ua has stopped, based on the current position of the normal unit Un and a result of detection by the relative distance detection portion SL. However, the present disclosure is not limited to such an example. When the self-position detection portion SP of the abnormal unit Ua is normal, the host controller Ct may detect the abnormal stop position Ps (current position) of the abnormal unit Ua by the self-position detection portion SP.

(3) The above embodiment has described an example in which the foreign object detection portion SF is provided in both the first transport unit U1 and the second transport unit U2. However, the present disclosure is not limited to such an example, and the foreign object detection portion SF only needs to be provided at a position suitable for detecting the foreign object F present on the travel path R. For example, the foreign object detection portion SF may be provided in the article storage rack 3, or may be provided on the ceiling or the floor surface of the facility. Note that it is also possible to adopt a configuration in which the foreign object detection portion SF is not provided in the article transport facility 100.

(4) The above embodiment has described an example in which the host controller Ct sets some of the storage sections 30 of the article storage rack 3 as the relay storage sections 30r in the normal operation control. However, the present disclosure is not limited to such an example, and the host controller Ct need not set any relay storage sections 30r in the normal operation control.

(5) The above embodiment has described an example in which the retracted position Pe is set at a position that does not overlap the article storage rack 3 as viewed in the arrangement direction Y. However, the present disclosure is not limited to such an example, the retracted position Pe may be set at a position that overlaps the article storage rack 3 as viewed in the arrangement direction Y.

(6) The above embodiment has described an example in which the first holding portion 14 is configured such that the article W is placed thereon, and is configured to be a fork type so as to be extended and retracted in the arrangement direction Y by the first transfer portion 15. However, the present disclosure is not limited to such an example, and the first transfer portion 15 only needs to be capable of transferring the article W between the first holding portion 14 and the storage section 30. As an example, the first holding portion 14 may be fixed so as to be immovable in the arrangement direction Y, and the first transfer portion 15 may include extendable/retractable arms that are disposed on opposite sides relative to the first holding portion 14 in the traveling direction X, and that extend and retract in the arrangement direction Y. In this case, the extendable/retractable arms hold the article W held on the first holding portion 14 or the article W held in the storage section 30 from opposite sides in the traveling direction X, and move the article W in the arrangement direction Y. Accordingly, the first transfer portion 15 is configured to transfer the article W between the first holding portion 14 and the storage section 30.

(7) The above embodiment has described an example in which each of the loading device 99 and the unloading device 98 is disposed outward of the article storage rack 3 in the traveling direction X. However, the present disclosure is not limited to such an example, and at least one of the loading device 99 and the unloading device 98 may be disposed in an intermediate region of the article storage rack 3 in the traveling direction X. In this case, for example, the article storage rack 3 includes a plurality of shelves disposed so as to be divided in the traveling direction X, and at least one of the loading device 99 and the unloading device 98 is disposed between the plurality of shelves in the traveling direction X.

(8) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

In the following, an outline of the article transport facility described above will be described.

An article transport facility includes: an article storage rack including a plurality of storage sections that each store an article;
an ended travel path that is set along a traveling direction extending along a front of the article storage rack;
two transport units that each transport the article; and
a control device that controls both of the transport units, wherein each of the two transport units includes a travel portion that travels along the travel path, a holding portion that holds the article, and a transfer portion that transfers the article between the holding portion and a storage section among the plurality of storage sections that is set as a transfer target location,
the two travel portions are configured to be unable to pass each other on the travel path, and,
the transport unit that has stopped abnormally due to occurrence of an abnormality being denoted as an abnormal unit, and the transport unit that can be operated normally being denoted as a normal unit,
the control device is capable of executing a normal operation control in which the two normal units are operated so as not to interfere with each other, and,
when one of the two transport units is the abnormal unit, and the other is the normal unit, is capable of executing a first abnormality control, a retraction control, and a second abnormality control,
the first abnormality control is a control in which a transferable range in which the normal unit is capable of transferring the article to and from the storage section without interfering with the abnormal unit is set to a partial range of the article storage rack, and the normal unit is operated using one or more of the storage sections included in the transferable range as the transfer target location,
the retraction control is a control for moving the abnormal unit to a retracted position that is set in an end region of the travel path in the traveling direction, and
the second abnormality control is a control in which, in a state in which the abnormal unit is retracted to the retracted position, the transferable range is set to a range wider than the transferable range set in the first abnormality control, and the normal unit is operated using a plurality of the storage sections included in the transferable range as the transfer target location.

With this configuration, the first abnormality control is executed by the control device when one of the two transport units has stopped abnormally due to occurrence of an abnormality. In the first abnormality control, the transferable range in which the normal unit that can be operated normally can transfer the article to and from the storage section without interfering with the abnormal unit that has stopped abnormally is set to a partial range of the article storage rack. Also, the normal unit is operated using one or more of the storage sections included within the transferable range as the transfer target locations. With such a configuration, it is possible to operate the normal unit in a limited manner within a range in which the normal unit can be operated, without waiting for the abnormal unit to be moved to the retracted position. Accordingly, it is possible to reduce the reduction in the overall operating ratio of the facility. After the retraction control has been executed, and the abnormal unit has been moved to the retracted position, the normal unit can be operated by executing the second abnormality control, using, as the transfer target locations, a plurality of the storage sections included in a range wider than the transferable range set in the first abnormality control. Accordingly, in this respect as well, it is possible to reduce the reduction in the overall operating ratio of the facility.

Here, it is preferable that, after starting execution of the first abnormality control, the control device executes the retraction control during execution of the first abnormality control.

With this configuration, the abnormal unit can be moved to the retracted position during execution of the first abnormality control. After the abnormal unit has been moved to the retracted position, it is possible to proceed to the second abnormality control in succession to the first abnormality control. Accordingly, with this configuration, it is possible to suppress the occurrence of a period during which the transport units are not operated, thus making it possible to reduce the reduction in the overall operating ratio of the facility.

It is preferable that the article transport facility further includes a relative distance detection portion that detects a relative distance between the two transport units in the traveling direction,
  wherein the control device detects an abnormal stop position, which is a position at which the abnormal unit has stopped, based on a current position of the normal unit and a result of detection by the relative distance detection portion, and sets a travelable range, which is a range in which the normal unit can travel on the travel path without interfering with the abnormal unit, based on the abnormal stop position, and
  a range of the transferable range in the traveling direction is set based on the travelable range.

With this configuration, the transferable range can be set based on the current position of the normal unit and the relative distance between the two transport units. Accordingly, the transferable range can be set appropriately.

It is preferable that, in the retraction control, the movement of the abnormal unit to the retracted position is performed using a driving force of the travel portion of the abnormal unit, or using a driving force that is separate from the driving force of the travel portion of the abnormal unit, and
  the control device ends the first abnormality control after determining that the abnormal unit has been moved to the retracted position, and starts the second abnormality control.

With this configuration, the movement of the abnormal unit to the retracted position can be realized using suitable means according to the situation at hand. Since the second abnormality control is started after determining that the abnormal unit has been moved to the retracted position, it is possible to appropriately execute the second abnormality control, while avoiding interference between the normal unit and the abnormal unit.

It is preferable that, in the normal operation control, the control device sets some of the storage sections of the article storage rack as relay storage sections serving as relay locations for delivering and receiving the article between the two transport units, and cancels the setting of the relay storage sections in the first abnormality control and the second abnormality control.

With this configuration, in the case of executing the first abnormality control and the second abnormality control, the relay storage sections can be used as normal storage sections for storing the article, and the storage efficiency of the article storage rack can be improved accordingly.

It is preferable that, when one of the two transport units has stopped abnormally, the control device provides a notification indicating the stopping, and enters a state in which the control device can receive an execution instruction of the first abnormality control, and the control device executes the first abnormality control when the execution instruction is received.

With this configuration, the control device executes the first abnormality control, for example, as a result of the operator inputting an execution instruction. Accordingly, in this case, the first abnormality control can be executed if it is determined, based on determination made by the operator, that the first abnormality control is necessary.

It is preferable that, separately from the configuration in which the control device receives the execution instruction as described above, when one of the two transport units has stopped abnormally, the control device performs an executability determination to determine whether or not the first abnormality control is executable, and the control device automatically executes the first abnormality control if the control device determines that the first abnormality control is executable.

With this configuration, it is possible to automatically execute the first abnormality control if it is determined, by the control device performing the executability determination, that the first abnormality control is executable, and not to execute the first abnormality control otherwise. Accordingly, with this configuration, it is possible to save the time and effort of the operator or the like, and promptly execute the first abnormality control. Therefore, it is possible to further reduce the reduction in the overall operating ratio of the facility.

It is preferable that, in the configuration in which the control device executes the executability determination, the article transport facility further includes a foreign object detection portion that detects a foreign object that is present on the travel path on the normal unit side relative to the abnormal unit,
  wherein conditions for determining that the first abnormality control is executable in the executability determination include a condition that the foreign object is not detected by the foreign object detection portion, and a condition that a position of the abnormal unit is not detected.

When a foreign object is present on the travel path on the normal unit side relative to the abnormal unit, there is the possibility that the normal unit that moves along the travel path may interfere with the foreign object. Additionally, when the position of the abnormal unit is unknown, there is the possibility that the normal unit that moves along the travel path may interfere with the abnormal unit. However, with this configuration, the control device determines that the first abnormality control is executable, on at least both the condition that the foreign object is not detected by the foreign object detection portion, and the condition that the position of the abnormal unit is not detected. Accordingly, with this configuration, it is possible to appropriately execute the first abnormality control, while avoiding the normal unit from interfering with the foreign object and the abnormal unit.

The technique according to the present disclosure is applicable to an article transport facility including an article storage rack including a plurality of storage sections that each store an article, an ended travel path that is set along a traveling direction extending along a front of the article storage rack, two transport units that each transport the article, and a control device that controls both of the transport units.

What is claimed is:
1. An article transport facility comprising:
  an article storage rack comprising a plurality of storage sections that each store an article;
  an ended travel path that is set along a traveling direction extending along a front of the article storage rack;
  two transport units that each transport the article; and
  a control device that controls both of the transport units, a relative distance detection portion comprising a laser range finder that detects a relative distance between the two transport units in the traveling direction, wherein:

each of the two transport units comprises a travel portion that travels along the travel path, a holding portion that holds the article, and a transfer portion that transfers the article between the holding portion and a storage section among the plurality of storage sections that is set as a transfer target location, the two travel portions are configured to be unable to pass each other on the travel path, the transport unit that has stopped abnormally due to occurrence of an abnormality is denoted as an abnormal unit, and the transport unit that can be operated normally is denoted as a normal unit, the control device is capable of executing a normal operation control in which the two normal units are operated so as not to interfere with each other, and, when one of the two transport units is the abnormal unit and the other is the normal unit, the control unit is capable of executing a first abnormality control, a retraction control, and a second abnormality control, the first abnormality control is a control in which a transferable range in which the normal unit is capable of transferring the article to and from the storage section without interfering with the abnormal unit is set to a partial range of the article storage rack, and the normal unit is operated using one or more of the storage sections included in the transferable range as the transfer target location, the retraction control is a control for moving the abnormal unit to a retracted position that is set in an end region of the travel path in the traveling direction, the second abnormality control is a control in which, in a state in which the abnormal unit is retracted to the retracted position, the transferable range is set to a range wider than the transferable range set in the first abnormality control, and the normal unit is operated using a plurality of the storage sections included in the transferable range as the transfer target location, and the control device detects an abnormal stop position, which is a position at which the abnormal unit has stopped, based on a current position of the normal unit and a result of detection by the relative distance detection portion, and sets a travelable range, which is a range in which the normal unit can travel on the travel path without interfering with the abnormal unit, based on the abnormal stop position, and a range of the transferable range in the traveling direction is set based on the travelable range.

2. The article transport facility according to claim 1, wherein, after starting execution of the first abnormality control, the control device executes the retraction control during execution of the first abnormality control.

3. The article transport facility according to claim 1, wherein:

the control device ends the first abnormality control after determining that the abnormal unit has been moved to the retracted position, and starts the second abnormality control.

4. The article transport facility according to claim 1, wherein, in the normal operation control, the control device sets some of the storage sections of the article storage rack as relay storage sections serving as relay locations for delivering and receiving the article between the two transport units, and cancels the setting of the relay storage sections in the first abnormality control and the second abnormality control.

5. The article transport facility according to claim 1, wherein, when one of the two transport units has stopped abnormally, the control device provides a notification indicating the stopping, and enters a state in which the control device can receive an execution instruction of the first abnormality control, and the control device executes the first abnormality control when the execution instruction is received.

6. The article transport facility according to claim 1, wherein, when one of the two transport units has stopped abnormally, the control device performs an executability determination to determine whether or not the first abnormality control is executable, and the control device automatically executes the first abnormality control if the control device determines that the first abnormality control is executable.

7. The article transport facility according to claim 6, further comprising:

a foreign object detection portion that detects a foreign object that is present on the travel path on the normal unit side relative to the abnormal unit, wherein conditions for determining that the first abnormality control is executable in the executability determination comprise a condition that the foreign object is not detected by the foreign object detection portion, and a condition that a position of the abnormal unit is not detected.

8. The article transport facility according to claim 1, wherein each of the two transport units includes a self-position detection portion that detects a current position of itself, and wherein the control device detects the abnormal stop position, based on the current position of the normal unit detected by the self-position detection portion of the normal unit and the result of detection by the relative distance detection portion.

9. The article transport facility according to claim 3, further comprising:

a sensor for detecting that the abnormal unit has reached the retracted position, wherein the control device determines whether the abnormal unit has been moved to the retracted position based on a result of detection by the sensor, and, in response to determining that the abnormal unit has been moved to the retracted position, ends the first abnormality control and starts the second abnormality control.

* * * * *